Figure 1:
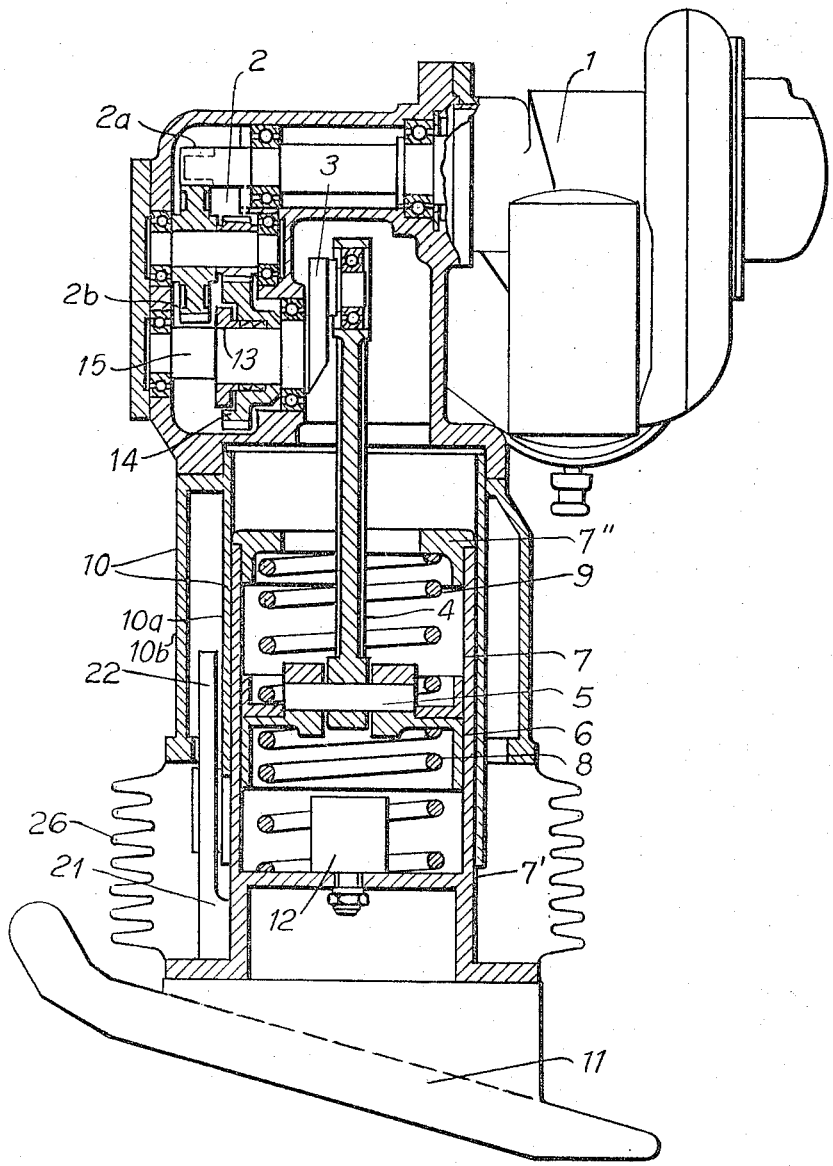

INVENTOR.
HEINRICH KESTEL

March 14, 1967 H. KESTEL 3,308,729
RECIPROCATING SYSTEM FOR MANUALLY GUIDED
MOTOR DRIVEN WORKING DEVICE
Filed July 20, 1964 2 Sheets-Sheet 2

INVENTOR.
HEINRICH KESTEL
BY
Robert H Jacob
AGT.

United States Patent Office 3,308,729
Patented Mar. 14, 1967

3,308,729
RECIPROCATING SYSTEM FOR MANUALLY GUIDED MOTOR DRIVEN WORKING DEVICE
Heinrich Kestel, Munich, Germany, assignor to Hermann Wacker and Peter Wacker, Munich, Germany
Filed July 20, 1964, Ser. No. 383,862
Claims priority, application Germany, Aug. 2, 1963, W 35,009
5 Claims. (Cl. 94—49)

The invention relates to devices or tools of the type operated by vibrating means for performing different working operations. More in particular the invention relates to reciprocating means or systems for manually guided, motor driven working devices of the percussion type.

Different types of such working devices are known where the device or tool effects reciprocating movements. In such equipment the drive motor is connected with the working device either rigidly or interchangeably. The transmission of force from the drive motor to the reciprocating system is effected by means of a pinion mounted on the motor shaft, a transmission connected thereto and a crank drive. The crank drive operates a connecting rod.

In one known embodiment of such a device a piston is linked to the lower end of the connecting rod by means of a pin to which a reciprocating movement is imparted in the housing of the working device. The piston carries a piston rod upon which a percussion piston is guided with one or more springs interconnected. During the reciprocating movement of the piston rod the percussion piston effects a greater stroke than the piston rod and pounds during one operating stroke upon the tool that is inserted in the lower part of the housing.

In the second known embodiment of such a device the connecting rod engages a cylinder which is axially slidable in the housing of the device. In the interior of this slidable cylinder a piston is slideably mounted which is supported by means of springs against the two ends of the cylinder. The piston is exchangeably connected with the working tool at the lower end of the device.

During the reciprocating movement of the connecting rod and the cylinder the springs disposed above and below the piston are alternately compressed and push the piston connected with the device up and down.

A third embodiment of such a device corresponds to the second embodiment with the difference that a connecting rod is connected with the piston by way of a piston rod and where the piston slides in a cylinder. This cylinder in turn is axially moveable in the housing of the device and is moved by the piston which is supported by means of springs against the two ends of the cylinder. In this embodiment the tool is rigidly connected with the cylinder.

All devices or tools which are designed in accordance with the above systems have the considerable shortcoming that the length of their thrust is limited and therefore they can only yield a limited compression force. Since the forward motion and the climbing ability of the working device also depend on the magnitude of a stroke the forward motion and the climbing ability cannot exceed a certain magnitude.

The length of the thrust is determined by the ratio of the lengths of the crank relative to the connecting rod which may not exceed or go below certain limits. If the radius of the crank is increased then the connecting rod must necessarily be lengthened. However, in the known embodiments lengthening of the connecting rod is not possible without considerable disadvantages. Any such increase in the length of the connecting rod requires a greater structural height as a result of which the center of gravity of the device is unfavorably shifted upwardly. This results in that the standing ability of the device is adversely affected. Moreover, such a device or tool is hard to guide and thus, besides an increased physical burden on the operator it produces a poor compression result.

In different known devices or tools attempts have been made to overcome the shortcomings of the tall form of construction and of the high center of gravity in that the driving motor with the transmission is displaced laterally with respect to the reciprocating system. However, this arrangement introduces the shortcoming that the center of gravity of the apparatus is located outside of the center line of the reciprocating system and thus again adversely affects the standing ability of the apparatus. In addition, this form of construction is also structurally more complicated because it requires additional housings for motor and transmission and further direction changing gears for the actual guiding of the reciprocating system. Such a device is also difficult to guide because the arrangement of the motor away from the center introduces shocks that must be absorbed by the operator.

It is an object of the invention to overcome the above shortcomings in a unique fashion in that the connecting rod driven by a crank is connected by way of a wrist pin directly with the piston without inter-connecting a piston rod, with the piston sliding in the working cylinder supported at the top and at the bottom by one or more springs against the ends of the working cylinder.

In accordance with this arrangement it is accomplished that even with long connecting rods, i.e., for large crank radii the structural height of the apparatus remains small.

A further object and advantage of the apparatus in accordance with the invention is to provide for small structural height which makes it possible to arrange the driving means directly above the reciprocating system. Advantageously, this is accomplished in such a manner that the motor is flanged to one side and the transmission to the opposite side as a counter weight. In this manner it is accomplished that the center of gravity of the device can be placed close to the center line of the reciprocating system and at very low height above the medium to be compressed.

Besides having the advantage of simple construction the apparatus in accordance with the invention due to the large stroke and the considerable jumping height respectively percussion output is distinguished by its high compression output, large forward movement and good climbing ability.

Furthermore, the apparatus is advantageously so constructed that the reciprocating system and its drive means are protected against damaging shock blows by suitable protective devices. Shock blows which are caused by such sudden movements of the device which run counter to the reciprocating system result in heavy loads on the drive means and the reciprocating system.

Particularly the springs are suddenly compressed by the shock blows so that the turns beat against each other. As a result, the springs are overloaded and deformed so that they fatigue and break. In order to prevent this a rubber block is provided in the bottom of the cylinder which limits the path of the springs.

In addition to the foregoing features the invention provides a friction clutch in order to protect the joints, bearings and the gears of the transmission against the forces of the shock blows.

As an additional object, the device or tool in accordance with the invention provides for the components of the reciprocating system being constructed in such a manner that they are protected against twisting or turning. Twisting or turning would apply such an adverse moment of torque to the bearings and joint pins as to essentially affect the life of such parts.

Figure 2:
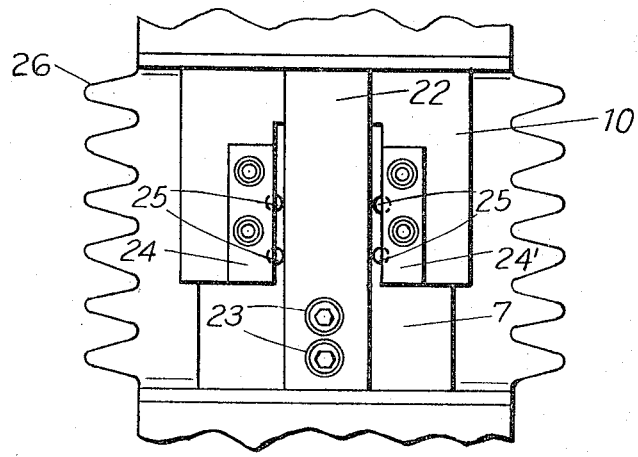
Figure 3:
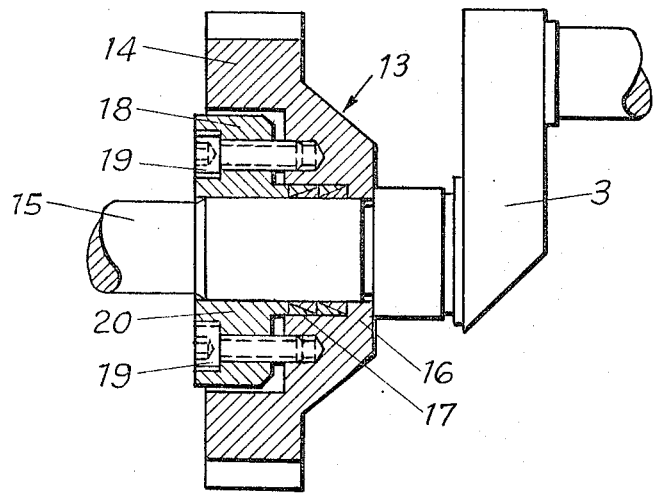

Further objects and advantageous features of the invention will become apparent from the following description, with reference to the accompanying drawings in which FIG. 1 is a sectional view of the device in accordance with the invention, FIG. 2 illustrates the safety means provided against turning of the work cylinders, and FIG. 3 shows the safety means which provide protection against shock blows.

As seen in FIG. 1, the device is provided with a drive motor 1 which may be an internal combustion motor or an electric motor which is provided with a pinion 2a and by way of a transmission 2 drives a crank 3 which has a stud to which a connecting rod 4 is fastened. Pinion 2a is in engagement with a gear 2b that forms part of the transmission 2. The connecting rod 4 is linked to a piston 6 by means of a pin or bolt 5 which slides in the work cylinder 7. Springs 8 and 9 bias the piston against the two ends 7' and 7" of the work cylinder 7. A tamping plate or foot 11 is mounted on the lower end of the work cylinder 7 which slides in the housing 10. Housing 10 comprises an inner cylinder portion 10a and an outer cylinder portion 10b.

In order to prevent beating of the turns of the spring 8 against each other during shock blows or beats a rubber block 12 is provided at the bottom end 7' of the work cylinder 7 which limits the path of travel of piston 6 and thereby contact between the turns of the springs.

Shock blows constitute a sudden heavy load on the transmission which is intercepted by friction clutch 13; this clutch can be incorporated in the front gear 14 which is arranged upon the shaft 15. Shaft 15 carries the crank 3. The front gear 14 is constructed in a manner that only one end 16 of the hub rests directly upon the shaft. The center part of the hub has an expansion cylinder which accommodates the friction layers 17 in the form of keys which towards the outside act upon the hub of the front gear 14 and towards the inside upon the shaft 15. The other end of the hub of the front gear 14 again is expanded cylindrically in such a manner that it can accommodate a ring 18. This ring 18 is tensioned against the front gear 14 by means of screws 19 and thus presses together the friction layers 17 by way of the collar portion 20. Depending on the tension of the screws 19 it is possible to make adjustments for the maximum moment of rotation that is to be transmitted.

The safety means 21 which secure the working cylinder 7 against rotation have a flat iron 22 rigidly connected to cylinder 7 by means of screws 23. The flat iron effects the same reciprocating movements as the working cylinder 7. In this connection the flat iron 22 slides between two jaws 24 and 24' which are rigidly secured to the inner cylinder portion 10a of housing 10. In order to reduce the friction and the wear the jaws are formed in a manner that rollers 25 are arranged in recessses and roll on the flat iron while it effects reciprocating movements.

All moveable parts of the reciprocating system having rotation preventing means are also protected against soiling towards the outside by means of the bellows 26.

Having now described my invention with reference to the embodiment illustrated in the drawings, I do not wish to be limited thereto, but what I desire to protect by Letters Patent of the United Sates is set forth in the appended claims.

I claim:
1. In a motor driven and manually guided working device operative to effect reciprocating movements and comprising a housing, a motor and transmission means including a pinion, a gear and a crank mounted in said housing, said housing having a portion defining an inner and an outer cylinder portion with a space therebetween, a reciprocating system disposed in said inner cylinder portion and comprising a working cylinder mounted for reciprocating movement in said inner cylinder portion, said working cylinder having an open top end wall and a bottom end wall, a working tool connected to the bottom end wall of said working cylinder, a piston having a connecting pin reciprocably mounted in said working cylinder, spring means disposed intermediate said piston and said top wall and intermediate said piston and said bottom wall, a connecting rod extending between said crank and said connecting pin and a resilient block mounted on said bottom end wall to protect the lower spring means against shock blows and thereby against wear and breakage.

2. A reciprocating system in accordance with claim 1, where a friction clutch is provided around said crank in said transmission means to further protect said transmission means and said motor against shock blows.

3. A reciprocating system in accordance with claim 1, where said transmission means includes a front gear and said crank has a shaft, said front gear having a hub including an expansion cylinder, friction means interposed between said shaft and said front gear in said expansion cylinder, said friction means being in the form of friction layers, said gear having a further expansion, a ring having a collar portion being received in said further expansion, and screw means being provided extending through said ring into said gear for adjustably pressing said collar portion against said friction layers.

4. A reciprocating system in accordance with claim 1, where means are provided for protecting said reciprocating system against rotation, said means being interposed between said inner cylinder and said working cylinder and including a flat iron on said working cylinder, a pair of jaws secured to the outside of said inner cylinder and a plurality of rollers interposed between said jaws and said flat iron.

5. A reciprocating system in accordance with claim 1, including a friction clutch disposed around said crank in said transmission means to protect said transmission means and said motor against shock blows, and means for protecting said reciprocating system against rotation interposed between said inner cylinder and said working cylinder.

References Cited by the Examiner

UNITED STATES PATENTS

| | | |
|---|---|---|
| 2,845,050 | 7/1958 | Wacker. |
| 3,090,286 | 5/1963 | Kestel _____ 94—48 |
| 3,109,354 | 11/1963 | Van Kirk _____ 94—49 |

JACOB L. NACKENOFF, Primary Examiner.